«12» United States Patent
Wang et al.

(10) Patent No.: US 10,962,862 B2
(45) Date of Patent: Mar. 30, 2021

(54) PUSH TYPE CAMERA DEVICE AND MOBILE TERMINAL HAVING THE SAME (71) Applicants: Fu Tai Hua Industry (Shenzhen) Co., Ltd., Shenzhen (CN); HON HAI PRECISION INDUSTRY CO., LTD., New Taipei (TW)

(72) Inventors: Min-Yue Wang, Shenzhen (CN); Xiao-Yi Qiu, Shenzhen (CN); He Zhou, Shenzhen (CN); Yong Zhao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 57 days.

(21) Appl. No.: 16/444,203

(22) Filed: Jun. 18, 2019

(65) Prior Publication Data
US 2020/0333690 A1 Oct. 22, 2020

(30) Foreign Application Priority Data
Apr. 22, 2019 (CN) .......................... 201920572091.4

(51) Int. Cl.
G03B 17/04 (2021.01)
H04M 1/02 (2006.01)

(52) U.S. Cl.
CPC .......... *G03B 17/04* (2013.01); *H04M 1/0264* (2013.01)

(58) Field of Classification Search
CPC ........... G03B 2215/0507; G03B 17/04; H04M 1/0264
See application file for complete search history.

(56) References Cited

U.S. PATENT DOCUMENTS

2007/0206116 A1* 9/2007 Chou ................... H04N 5/2251 348/373
2008/0002965 A1* 1/2008 Huang ................... G03B 17/04 396/419
2017/0366652 A1* 12/2017 Boerckel ............. H04M 1/0264

* cited by examiner

*Primary Examiner* — Noam Reisner
(74) *Attorney, Agent, or Firm* — ScienBiziP, P.C.

(57) ABSTRACT

A push type camera device in a mobile terminal can be pushed to protrude out of the mobile terminal for photographing or be hidden in the mobile terminal. The push type camera device includes a slide assembly, a fixing bracket, a resilient assembly, and a camera assembly. The fixing bracket is fixed and located in the mobile terminal. The slide assembly is slidably mounted on the fixing bracket. The resilient assembly connects the slide assembly and the fixing bracket, and is configured for fixing or supporting the slide assembly. The camera assembly is arranged on the slide assembly. The camera assembly can be pushed to protrude out of or back into the mobile terminal by sliding the slide assembly relative to the fixing bracket. A mobile terminal having the push type camera device is also provided.

10 Claims, 6 Drawing Sheets

PUSH TYPE CAMERA DEVICE AND MOBILE TERMINAL HAVING THE SAME

FIELD

The subject matter herein generally relates to image-capturing in mobile terminals, in particular to a push type camera device and a mobile terminal having the same.

BACKGROUND

A mobile terminal generally has a front camera and a rear camera, the front camera is located on a front display area of the mobile terminal and the positions of such cameras in the two types are fixed, so that the integrity of the front display area of the mobile terminal is destroyed, which limits the expansion of the screen of the mobile terminal.

Therefore, there is room for improvement within the art.

BRIEF DESCRIPTION OF THE DRAWINGS

Implementations of the present technology will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Figure 1:
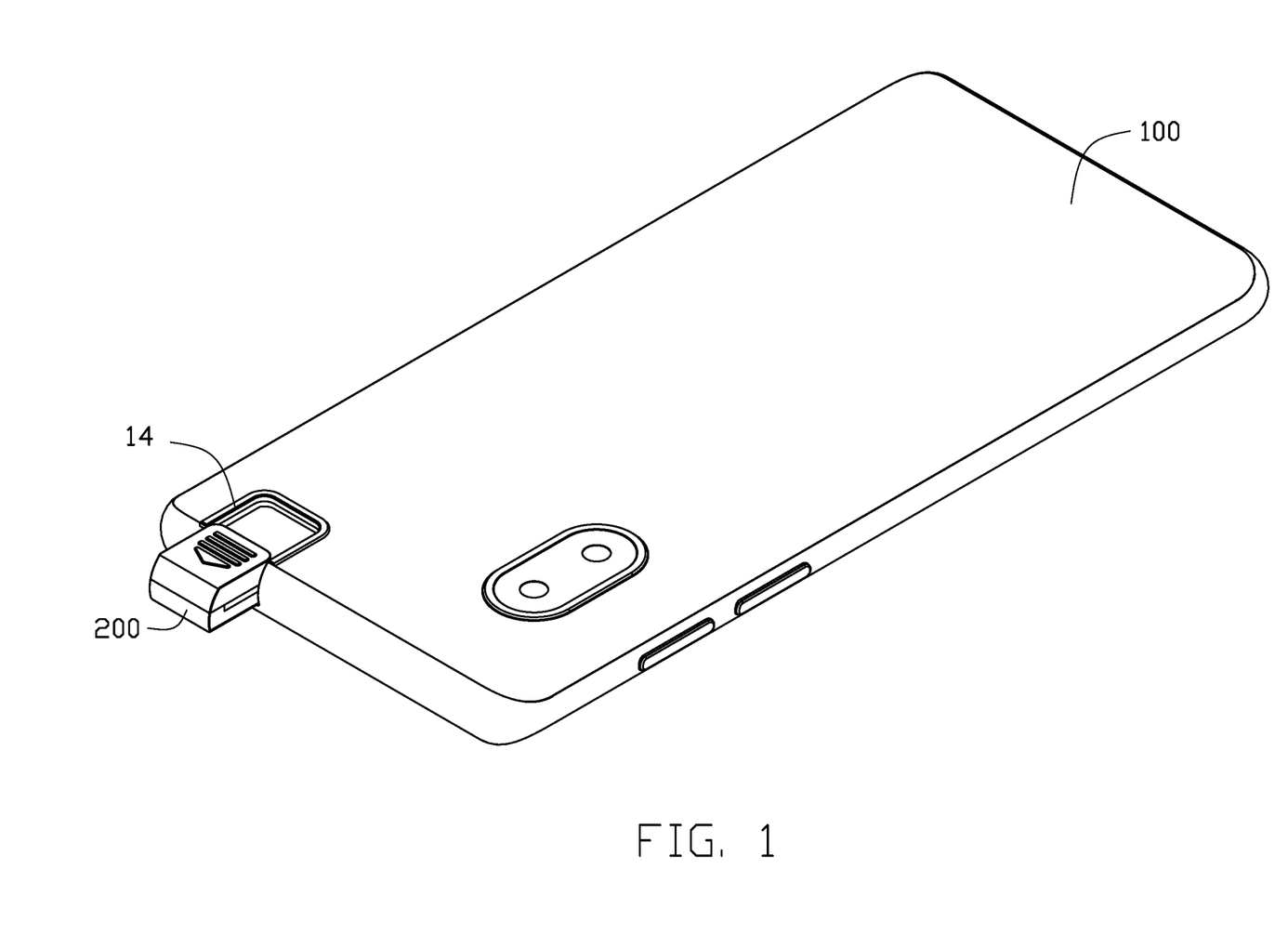
FIG. 1 is an isometric view of an assembled push type camera device applied in a mobile terminal according to an embodiment.
Figure 2:
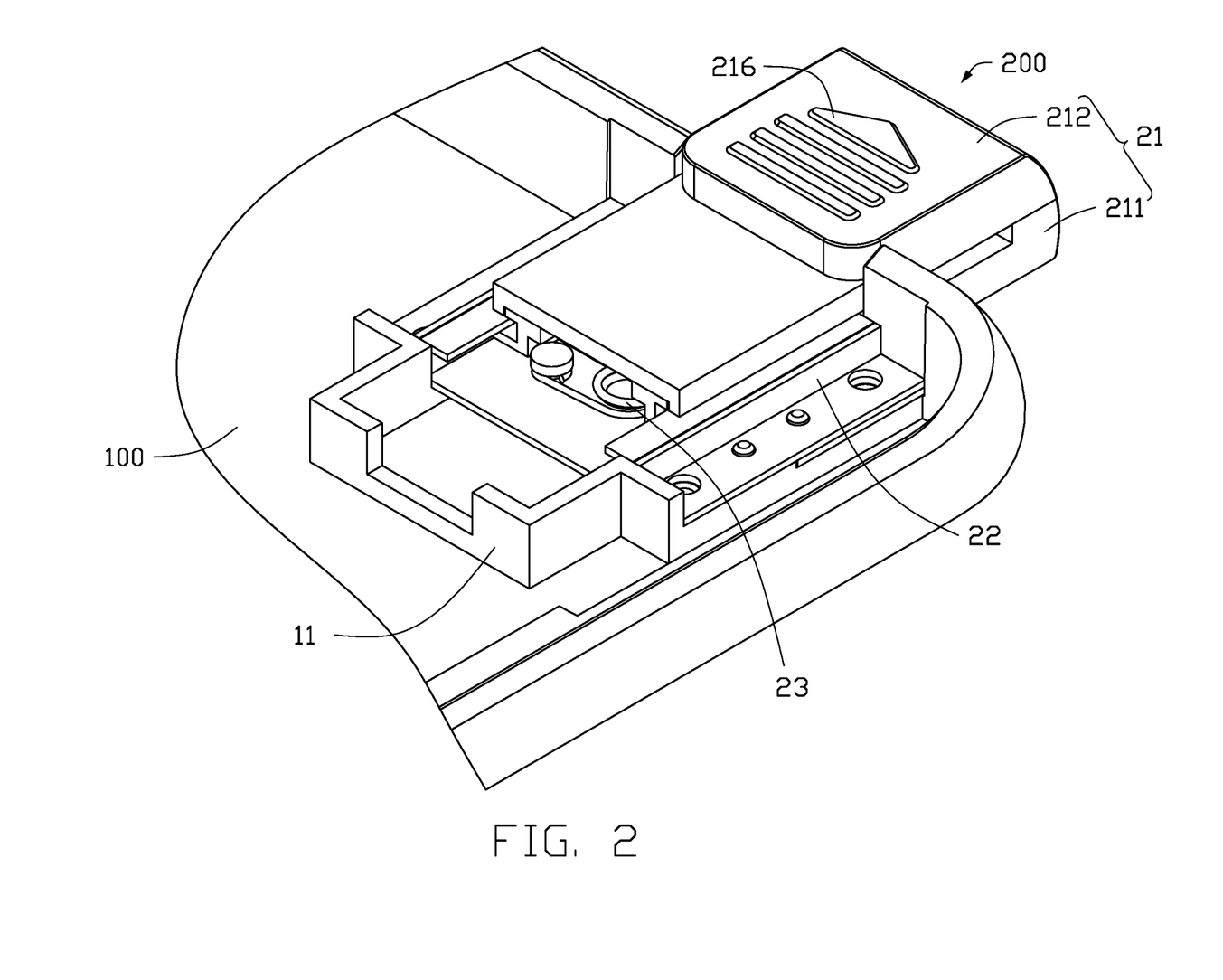
FIG. 2 is an isometric view of the push type camera device of FIG. 1 protruding out of the mobile terminal.
Figure 3:
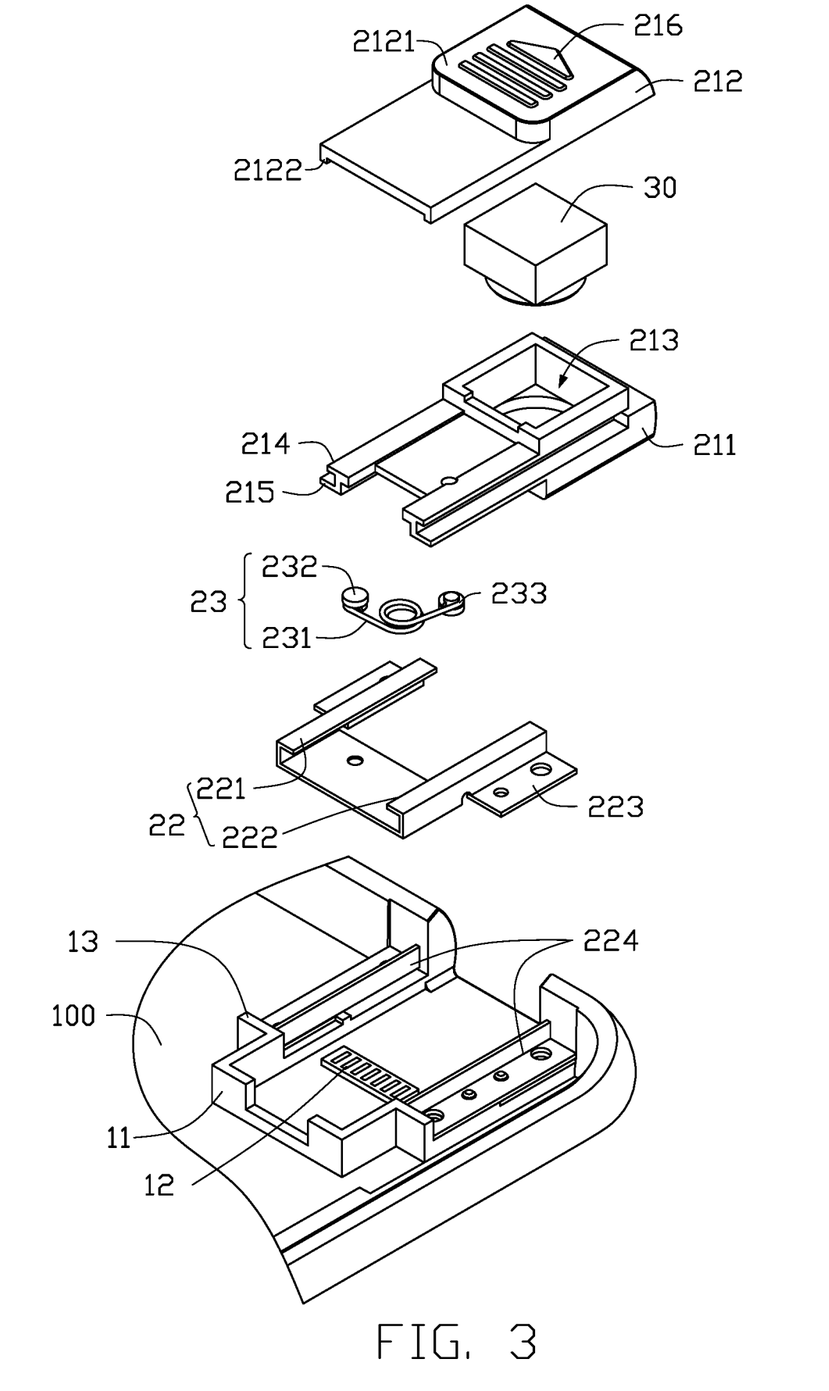
FIG. 3 is an isometric view of the push type camera device of FIG. 1 when exposed.

FIG. 1 shows a push type camera device 200 of an embodiment in a mobile terminal 100. The push type camera device 200 can be pushed to protrude out of the mobile terminal 100 for photographing or can be retracted and hidden in the mobile terminal 100. Referring to FIG. 2, the push type camera device 200 includes a slide assembly 21, a fixing bracket 22, a resilient assembly 23, and a camera assembly 30 (as shown in FIG. 3). The fixing bracket 22 is fixed and located in the mobile terminal 100. The slide assembly 21 is slidably mounted on the fixing bracket 22. The resilient assembly 23 connects the slide assembly 21 and the fixing bracket 22, and is configured for fixing or supporting the slide assembly 21. The camera assembly 30 is arranged on the slide assembly 21. The camera assembly 30 can be pushed to protrude out of or pushed back into the mobile terminal 100 by sliding the slide assembly 21 relative to the fixing bracket 22.

Figure 4:
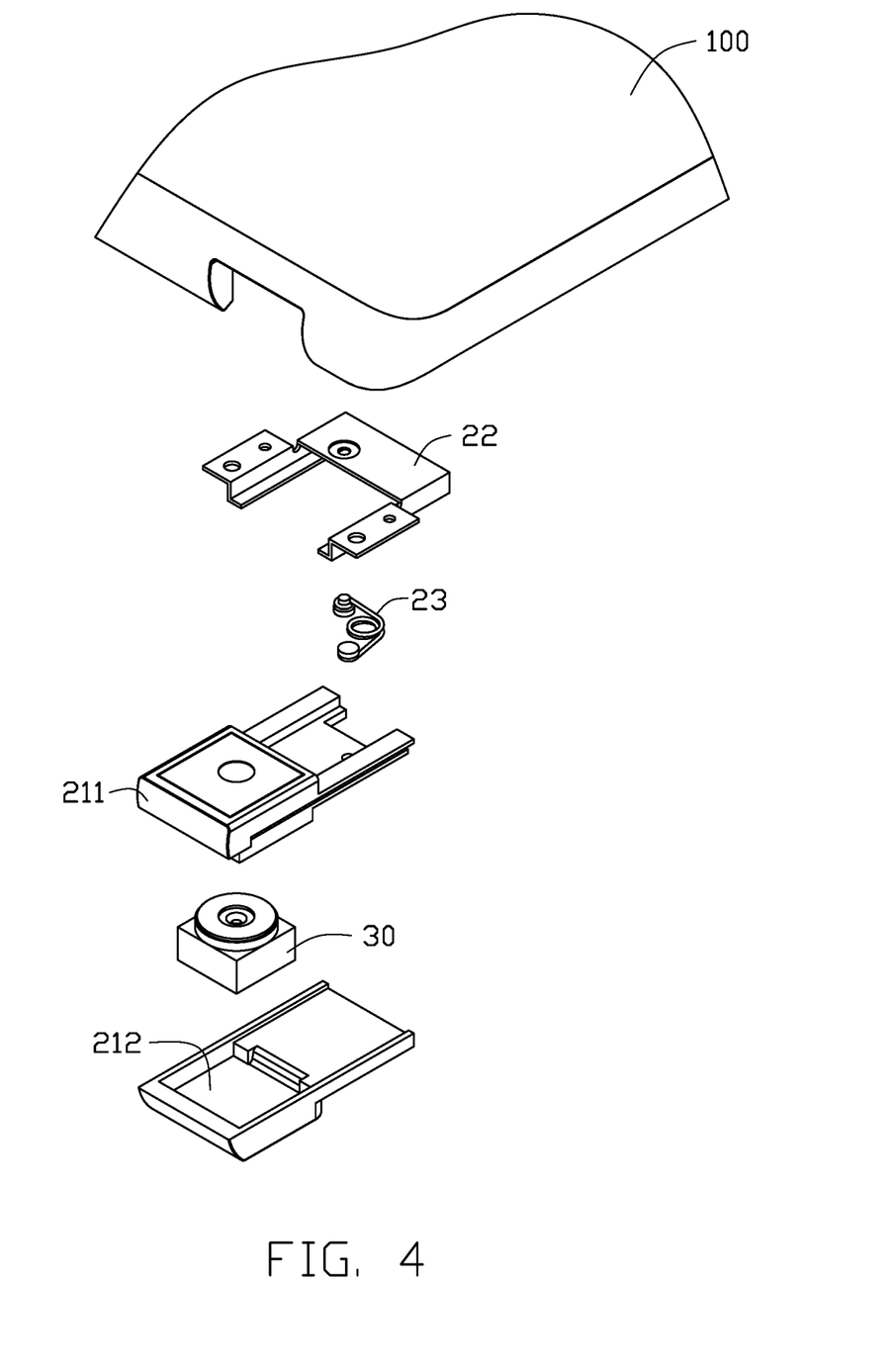
FIG. 4 shows the push type camera device of FIG. 3 from another angle.

Specifically, referring to FIG. 3 and FIG. 4, the slide assembly 21 includes a bottom board 211 and a cover board 212 covering the bottom board 211. The bottom board 211 is selected to be slidably mounted on the fixing bracket 22, to be received in the fixing bracket 22, or to protrude out of the fixing bracket 22. The camera assembly 30 is detachably arranged on a chamber 213 of the bottom board 211. The chamber 213 is located on an upper end of the bottom board 211. A first positioning portion 214 and a second positioning portion 215 are designed to extend from each of two opposite edges of the bottom board 211. Each of the two first positioning portions 214 extends from an upper portion of the edge of the bottom board 211 towards the cover board 212. Each of the two second positioning portions 215 extends from a lower portion of the edge of the bottom board 211 towards the fixing bracket 22. The first positioning portions 214 are configured to match with the cover board 212 for connection. The second positioning portions 215 are configured to match with the fixing bracket 22, such that the slide assembly 21 can be oriented and slide relative to the fixing bracket 22. A length of the second positioning portion 215 is longer than a length of the first positioning portion 214, allowing and ensuring that the second positioning portions 215 are smoothly received in sliding slots of the fixing bracket 22.

A pushing member 2121 is formed on a top surface of the cover board 212. In an embodiment, the pushing member 2121 extends upwards from upper half of the top surface of the cover board 212. A groove 14 is defined on a surface of the mobile terminal 100. When the push type camera device 200 is hidden in the mobile terminal 100, the pushing member 2121 is received in the groove 14 and exposed from the surface of the mobile terminal 100, such that it is convenience for users to push the pushing member 2121 by a finger or any other tools to drive the push type camera device 200 protruding out of the mobile terminal 100. A booster 216 is provided on a surface of the pushing member 2121. In an embodiment, the booster 216 acts as a plurality of bumps. The bumps can be arranged to form an arrows for indicating a pushing direction. Two opposite edges of a bottom surface of the cover board 212 are provided with connecting portions 2122. When the cover board 212 is coupled with the bottom board 211, each of the first positioning portions 214 correspondingly resists an inner side of one of the connecting portions 2122, such that the cover board 212 matches with the bottom board 211 through interference fit.

The fixing bracket 22 is fixed on a retaining nest 11 of the mobile terminal 100. An upper portion of the retaining nest 11 protrudes upwards and perpendicularly from an edge of the retaining nest 11 to form a resisting portion 13. A lower end of the fixing bracket 22 abuts against the resisting portion 13, and an upper end of the fixing bracket 22 abuts against an inner side of the mobile terminal 100. A width of the retaining nest 11 is equal to or slightly larger than a width of the slide assembly 21. The slide assembly 21 can slide along the fixing bracket 22 to the retaining nest 11, such that the push type camera device 200 is pushed to be hidden in the mobile terminal 100. A camera circuit board 12 is provided on the retaining nest 11 of the mobile terminal 100. In an embodiment, the camera assembly 30 is electrically connected with the camera circuit board 12 via flexible cables. In other embodiments, the camera assembly 30 may be electrically connected with the camera circuit board 12 wirelessly, not being limited.

A first sliding slot 221 and a second sliding slot 222 are respectively defined on two opposite lateral sides of the fixing bracket 22. The second positioning portions 215 of the bottom board 211 are corresponding received in the first sliding slot 221 and second sliding slot 222. A fixing portion 223 is provided on a rear side of each of the first sliding slot 221 and second sliding slot 222. A plurality of holes (not shown) are defined on the fixing portions 223 for fixing the fixing bracket 22 on the retaining nest 11. The fixing bracket 22 further includes two bracket fixtures 224. After the fixing bracket 22 is fixed on the mobile terminal 100, the two bracket fixtures 224 are located on two opposite lateral sides of the fixing bracket 22, correspondingly to abut against the rear sides of the first sliding slot 221 and the second sliding slot 222, and the fixing portions 223 being correspondingly thus held down, such that preventing the fixing bracket 22 from becoming loosen.

The resilient assembly 23 includes a first elastic member 231 and two positioning members 232. In an embodiment, the first elastic member 231 is a spring, and the positioning member 232 is a screw. The first elastic member 231 is bent at both ends to form two substantially circular installing portions 233. The positioning members 232 pass through the installing portions 233 to fix one end of the first elastic member 231 to the bottom board 211, and fix the another end of the first elastic member 231 to the fixing bracket 22. The bottom board 211 and the fixing bracket 22 provide holes corresponding to the positioning members 232.

When the slide assembly 21 is received in the fixing bracket 22 (the camera assembly 30 is hidden in the mobile terminal 100), the first elastic member 231 is in an initial state, that is, the first elastic member 231 is in a compressed or natural state. The two ends of the first elastic member 231 apply a reverse elastic force to the slide assembly 21 and the fixing bracket 22, such that the second positioning portions 215 abut against the inner sides of the first sliding slot 221 and the second sliding slot 222, such that the slide assembly 21 and the fixing bracket 22 are thus relatively fixed, and the camera assembly 30 is prevented from disengaging from the mobile terminal 100 when the mobile terminal 100 is inverted or shaken. When the slide assembly 21 is pushed against the elastic force of the first elastic member 231 to protrude out of the mobile terminal 100, the first elastic member 231 is deformed as the slide assembly 21 moves. When the slide assembly 21 slides out to the maximum or preset distance, the first elastic member 231 rebounds to the initial state again, such that the slide assembly 21 and the fixing bracket 22 are relatively fixed again, and supporting the slide assembly 21 to avoid the camera assembly 30 suddenly retracting into the mobile terminal 100 during use.

When the camera assembly 30 needs to be restored to the hidden state, the user can drive the slide assembly 21 to slide downwardly along the fixing bracket 22 against the elastic force of the first elastic member 231 by pressing the top end of the slide assembly 21, and the first elastic member 231 is deformed against as the slide assembly 21 moves. When the slide assembly 21 is entirely received in the fixing bracket 22, the first elastic member 231 rebounds to the initial state.

Figure 5:
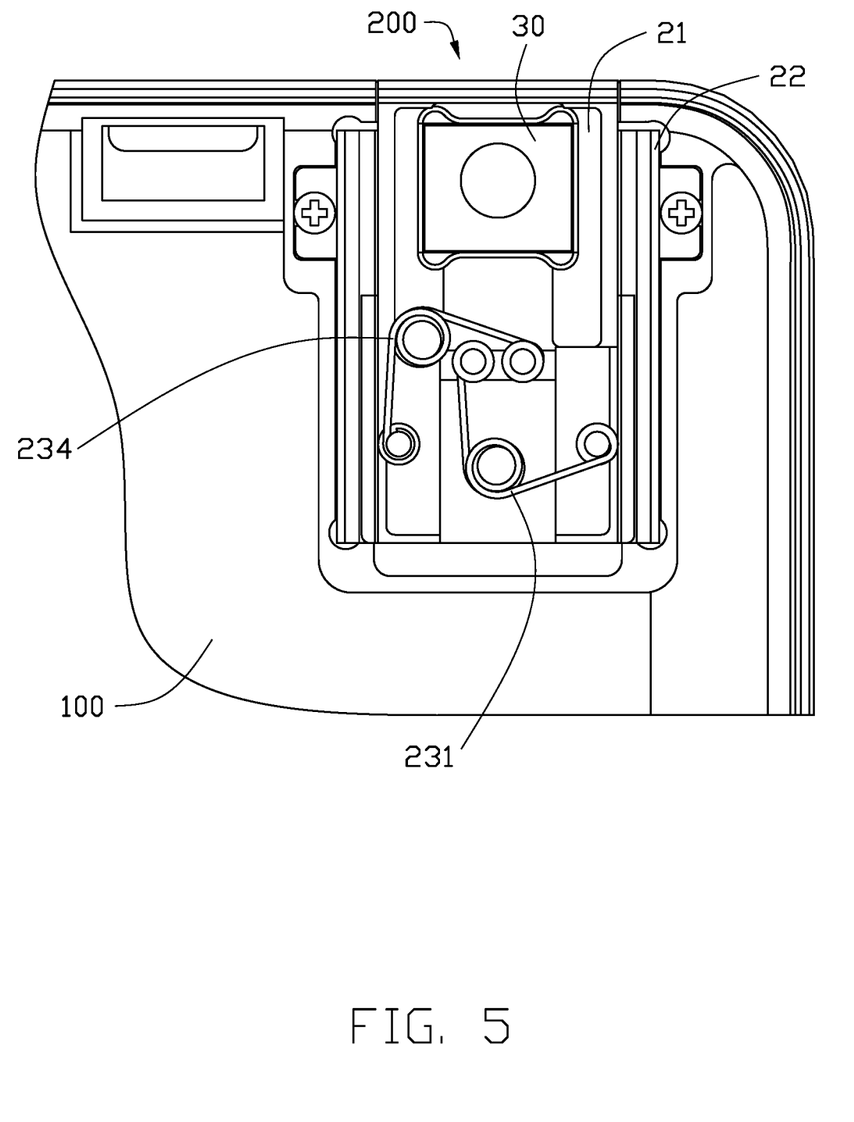
FIG. 5 is an isometric view of the assembled push type camera device according to another embodiment.
Figure 6:
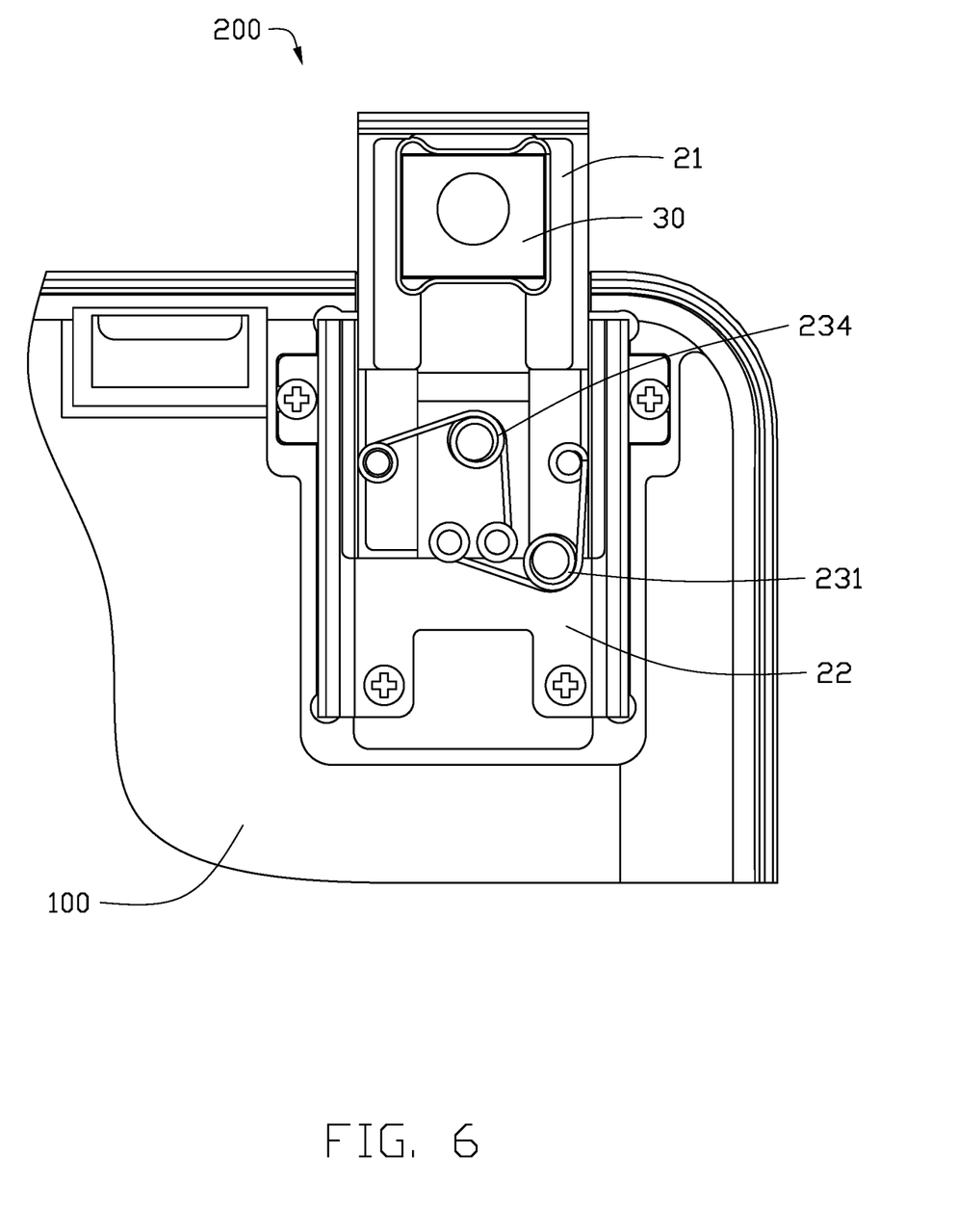
FIG. 6 is an isometric view of the push type camera device of FIG. 5 protruding out of a mobile terminal.

FIG. 5 and FIG. 6 show a second embodiment of the push type camera device. The push type camera device 200 of the second embodiment is substantially the same as that of the first embodiment, except that the resilient assembly 23 of the second embodiment further includes a second elastic member 234. The second elastic member 234 has the same structure as the first elastic member 231, and is a torsion spring. One end of the second elastic member 234 is fixed to the fixing bracket 22, and the other end of the second elastic member 234 is fixed to the slide assembly 21. The first elastic member 231 and the second elastic member 234 are substantially in a "V" shape. An opening of the "V" of the first elastic member 231 is leftwards and obliquely upwards. The second elastic member 234 is located substantially at upper left of the first elastic member 231, and an opening of the "V" of the second elastic member 234 is substantially downwards and faces the first elastic member 231. One end of the left side of the first elastic member 231 and one end of the right side of the second elastic member 234 are substantially fixed to the middle of the fixing bracket 22 by the positioning member 232 (shown in FIG. 3), and are fixed at the same horizontal position and close to each other. One end of the right side of the first elastic member 231 is fixed to the slide assembly 21 and close to an right boundary of the slide assembly 21, and one end of the left side of the second elastic member 234 is fixed to the slide assembly 21 and close to an left boundary of the slide assembly 21.

When the camera assembly 30 is hidden in the mobile terminal 100, the first elastic member 231 and the second elastic member 234 are both in an initial state. The two elastic elements respectively apply the reverse elastic force to the slide assembly 21 and the fixing bracket 22, such that the slide assembly 21 and the fixing bracket 22 are relatively fixed, and the camera assembly 30 is prevented from disengaging from the mobile terminal 100 when the mobile terminal 100 is inverted or shaken.

When the slide assembly 21 is pushed against the elastic forces of the first elastic member 231 and the second elastic member 234 to protrude out of the mobile terminal 100, the first elastic member 231 and the second elastic member 234 are deformed as the slide assembly 21 moves. When the slide assembly 21 moves upwards: the left side of the first elastic member 231 remains stationary, whereas the right side of the first elastic member 231 moves upwards along with the slide assembly 21, such that the opening of the "V" of the first elastic member 231 is squeezed inwards and decreased; the right side of the second elastic member 234 remains stationary, whereas the left side of the second elastic member 234 moves upwards along with the slide assembly 21, such that the opening of the "V" of the second elastic member 234 is squeezed inwards and decreased. When the slide assembly 21 slides out to the maximum or preset distance, the first elastic member 231 and the second elastic member 234 rebound to the initial state again, such that the slide assembly 21 and the fixing bracket 22 are relatively fixed again, and supporting the slide assembly 21 to avoid the camera assembly 30 suddenly retracting into the mobile terminal 100 during use. At present, the opening of the "V" of the second elastic member 234 faces the lower left, and the opening of the "V" of the first elastic member 231 faces substantially to the upper left and faces the second elastic member 234.

The second elastic member 234 enhances the support given by the resilient assembly 23 to the slide assembly 21, while reducing the fatigue damage of the resilient assembly 23. The process of restoring the camera assembly 30 to the hidden state is similar to that of the first embodiment and is not repeated.

The embodiments shown and described above are only examples. Many such details are found in the relevant art. Therefore, such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A push type camera device applying in a mobile terminal, comprising:
   a slide assembly;
   a fixing bracket fixed and located in the mobile terminal;
   a resilient assembly connecting the slide assembly and the fixing bracket for fixing or supporting the slide assembly; and
   a camera assembly arranged on the slide assembly; and
   wherein the slide assembly is slidably mounted on the fixing bracket, the camera assembly is configured to be pushed to protrude out of or be hidden in the mobile terminal 100 by sliding the slide assembly relative to the fixing bracket;
   wherein the slide assembly comprises a bottom board and a cover board covering on the bottom board, the bottom board is slidably mounted on the fixing bracket;
   wherein the camera assembly is detachably arranged on a chamber of the bottom board;
   wherein a groove is defined on a surface of the mobile terminal, the slide assembly is configured to slide along the fixing bracket to a retaining nest, such that the camera assembly is pushed to be hidden in the mobile terminal;
   wherein a pushing member is formed on a top surface of the cover board, a groove is defined on a surface of the mobile terminal, and the pushing member is received in the groove,
   wherein a booster is provided on a surface of the pushing member, users are able to apply a force to the pushing member through the booster to push the camera assembly to protrude out of or retract in the mobile terminal.

2. The push type camera device of claim 1, wherein a first positioning portion is designed to extend from each of two opposite edges of the bottom board, the first positioning portions are configured to match with the cover board for connection.

3. The push type camera device of claim 1, wherein a second positioning portion is designed to extend from each of two opposite edges of the bottom board, a first sliding slot and a second sliding slot are respectively defined on two opposite lateral sides of the fixing bracket, the second positioning portions are corresponding received in the first sliding slot and the second sliding slot.

4. The push type camera device of claim 1, wherein the resilient assembly comprises a first elastic member and two positioning members; one end of the first elastic member is fixed to the bottom board by one of the positioning member, and another end of the first elastic member is fixed to the fixing bracket by another positioning member, such that the first elastic member fixes the slide assembly to the fixing bracket; and the slide assembly is configured to be pushed against an elastic force of the first elastic member to slide along the fixing bracket.

5. The push type camera device of claim 4, wherein the resilient assembly further comprises a second elastic member, one end of the second elastic member is fixed to the bottom board by a first extra positioning member, and another end of the second elastic member is fixed to the fixing bracket by a second extra positioning member.

6. A mobile terminal, having camera function, comprising:
   a push type camera device comprising:
      a slide assembly;
      a fixing bracket fixed and located in the mobile terminal;
      a resilient assembly connecting the slide assembly and the fixing bracket for fixing or supporting the slide assembly; and
      a camera assembly arranged on the slide assembly; and
   wherein the slide assembly is slidably mounted on the fixing bracket, the camera assembly is configured to be pushed to protrude out of or be hidden in the mobile terminal by sliding the slide assembly relative to the fixing bracket;
   wherein the slide assembly comprises a bottom board and a cover board covering on the bottom board, the bottom board is slidably mounted on the fixing bracket;
   wherein the camera assembly is detachably arranged on a chamber of the bottom board;
   wherein a groove is defined on a surface of the mobile terminal, the slide assembly is configured to slide along the fixing bracket to a retaining nest such that the camera assembly is pushed to be hidden in the mobile terminal;
   wherein a pushing member is formed on a top surface of the cover board, a groove is defined on a surface of the mobile terminal, and the pushing member is received in the groove,
   wherein a booster is provided on a surface of the pushing member, users are able to apply a force to the pushing member through the booster to push the camera assembly to protrude out of or retract in the mobile terminal.

7. The mobile terminal of claim 6, wherein a first positioning portion is designed to extend from each of two opposite edges of the bottom board, the first positioning portions are configured to match with the cover board for connection.

8. The mobile terminal of claim 6, wherein a second positioning portion is designed to extend from each of two opposite edges of the bottom board, a first sliding slot and a second sliding slot are respectively defined on two opposite lateral sides of the fixing bracket, the second positioning portions are corresponding received in the first sliding slot and the second sliding slot.

9. The mobile terminal of claim 6, wherein the resilient assembly comprises a first elastic member and two positioning members; one end of the first elastic member is fixed to the bottom board by one of the positioning member, and another end of the first elastic member is fixed to the fixing bracket by another positioning member, such that the first elastic member fixes the slide assembly to the fixing bracket; and the slide assembly is configured to be pushed against an elastic force of the first elastic member to slide along the fixing bracket.

10. The mobile terminal of claim 9, wherein the resilient assembly further comprises a second elastic member, one end of the second elastic member is fixed to the bottom board by a first extra positioning member, and another end of the second elastic member is fixed to the fixing bracket by a second extra positioning member.

* * * * *